US010194329B2

(12) United States Patent
Aoyama (10) Patent No.: US 10,194,329 B2
(45) Date of Patent: Jan. 29, 2019

(54) SITE POSITION PRIORITY DETERMINATION DEVICE AND METHOD (71) Applicant: NEC CORPORATION, Tokyo (JP)

(72) Inventor: Akio Aoyama, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/553,289

(22) PCT Filed: Mar. 14, 2016

(86) PCT No.: PCT/JP2016/001430
§ 371 (c)(1),
(2) Date: Aug. 24, 2017

(87) PCT Pub. No.: WO2016/152078
PCT Pub. Date: Sep. 29, 2016

(65) Prior Publication Data
US 2018/0049040 A1 Feb. 15, 2018

(30) Foreign Application Priority Data

Mar. 20, 2015 (JP) ................... 2015-057901

(51) Int. Cl.
H04W 16/18 (2009.01)
H04W 16/32 (2009.01)

(52) U.S. Cl.
CPC ........... H04W 16/18 (2013.01); H04W 16/32 (2013.01)

(58) Field of Classification Search
CPC .................................................. H04W 16/18
See application file for complete search history.

(56) References Cited

U.S. PATENT DOCUMENTS

2004/0236547 A1* 11/2004 Rappaport ............ G06F 17/509
703/2
2012/0108246 A1 5/2012 Monogioudis
(Continued)

FOREIGN PATENT DOCUMENTS

EP 1 414 257 A1 4/2004
EP 2 741 535 A1 6/2014
(Continued)

OTHER PUBLICATIONS

International Search Report for PCT/JP2016/001430 dated Jun. 7, 2016 [PCT/ISA/210].
(Continued)

Primary Examiner — Charles N Appiah
Assistant Examiner — Frank E Donado
(74) Attorney, Agent, or Firm — Sughrue Mion, PLLC (57) ABSTRACT

[Problem] To provide a site position priority order determination device and associated method with which it is possible to create a high-reliability site position priority order list in a shorter time. [Solution] The present invention has: a radio communication apparatus; a site position priority calculation unit for calculating the degree of nonattainment and the estimated degree of attainment for target service quality at a site position, the degree of tightness of a cell load, the degree of cell capacity supplied in response to demand traffic, and the degree of dominance of competing companies regarding service quality, calculating the weighted sum of these values, and outputting the result as site position priority; a site position priority storage unit for saving the individual site position priority per site position; and a site position priority order determination unit for determining, on the basis of the site position priority per site position, the priority order of a site position at which a new wireless base station is installed, and outputting a site (Continued)

position priority order list indicating the determined priority order of the site position.

7 Claims, 6 Drawing Sheets

(56) References Cited

U.S. PATENT DOCUMENTS

2013/0053047 A1* 2/2013 Rai ................... H04W 16/18
455/448
2014/0342744 A1* 11/2014 Brisebois ............ H04W 24/02
455/446

FOREIGN PATENT DOCUMENTS

EP        2 785 095 B1    9/2016
JP         9-502068 A      2/1997

OTHER PUBLICATIONS

Written Opinion for PCT/JP2016/001430 dated Jun. 7, 2016 [PCT/ISA/237].
Extended European Search Report dated Oct. 17, 2018 issued by the European Patent Office in counterpart application No. 16767987.7.

* cited by examiner

| SITE POSITION PRIORITY ORDER LIST | | | | |
|---|---|---|---|---|
| SITE POSITION PRIORITY ORDER | SITE ID | SITE POSITION | CURRENT THROUGHPUT | FUTURE THROUGHPUT |
| 1 | ID034 | LATITUDE XXX.XX<br>LONGITUDE xxx.xx | xx Mbps | xx Mbps |
| 2 | ID125 | LATITUDE XXX.XX<br>LONGITUDE xxx.xx | xx Mbps | xx Mbps |
| 3 | ID008 | LATITUDE XXX.XX<br>LONGITUDE xxx.xx | xx Mbps | xx Mbps |
| 4 | ID021 | LATITUDE XXX.XX<br>LONGITUDE xxx.xx | xx Mbps | .... |
| .. | .. | .. | .. | .. |
| x | IDxxx | LATITUDE XXX.XX<br>LONGITUDE xxx.xx | xx Mbps | .... |

RETURN TO PARAMETER INPUT

SITE POSITION PRIORITY DETERMINATION DEVICE AND METHOD

CROSS REFERENCE TO RELATED APPLICATIONS

This application is a National Stage of International Application No. PCT/JP2016/001430, filed on Mar. 14, 2016, which claims priority from Japanese Patent Application No. 2015-057901, filed on Mar. 20, 2015, the contents of all of which are incorporated herein by reference in their entirety.

TECHNICAL FIELD

The present invention relates to a site position priority order determination device and a method therefor for determining a priority order of a site position at which a new radio base station is to be installed.

BACKGROUND ART

A work process for constructing a radio communication network includes network design, site survey, site acquisition (acquisition of a site), installation work, and network optimization. The site survey indicates a preliminary survey that, in cases where a new radio base station is to be installed, is conducted on a radio wave environment at a candidate location for the installation. By means of the site survey, priority orders of candidate locations (site positions) at which a new radio base station is to be actually installed out of a plurality of candidate locations are determined.

Figure 6:
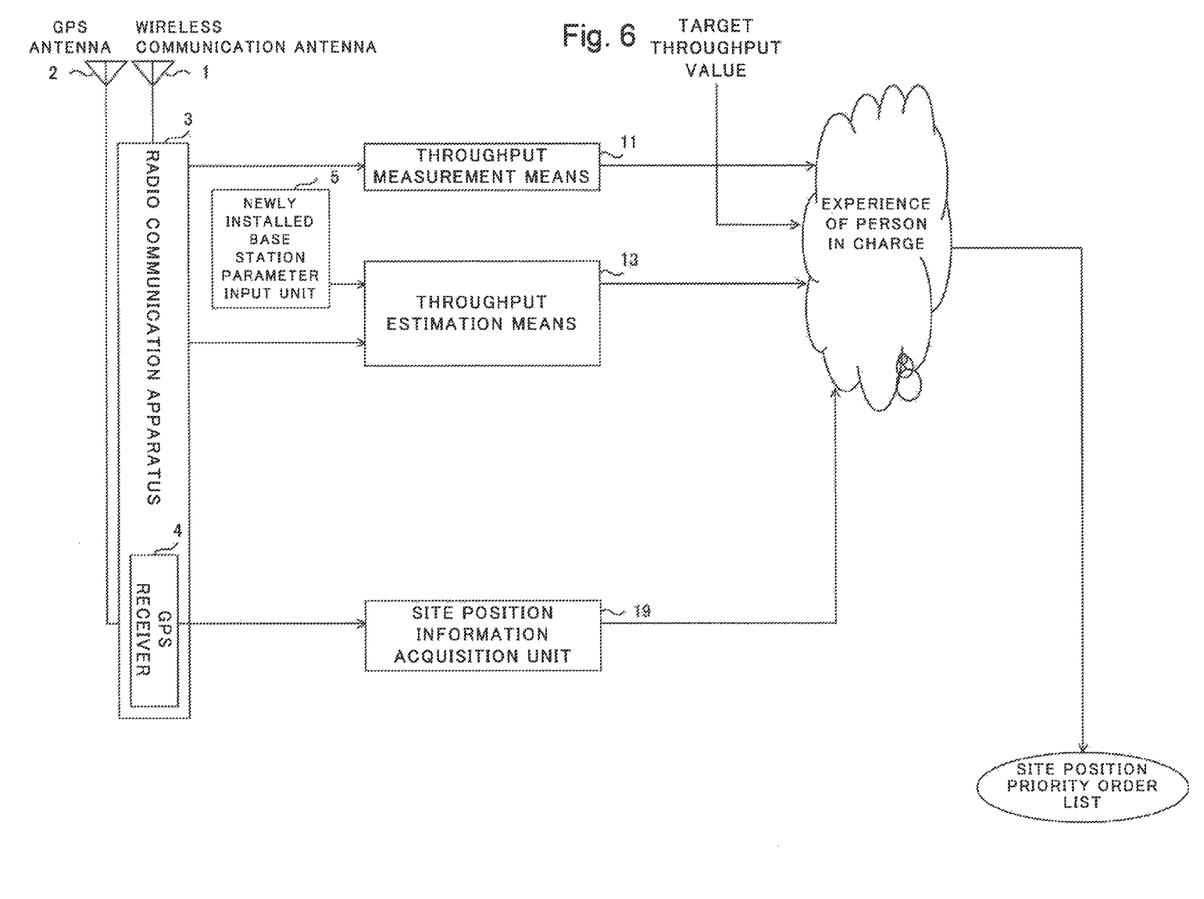
FIG. 6 is a schematic view illustrating a priority order determination method of site positions in a related art.

FIG. 6 is a schematic view illustrating a determination method of a priority order of a site position in a conventional art dealing with site positions.

In a site survey of the conventional art illustrated in FIG. 6, a throughput measurement means 11 actually measures a throughput at each site position using a radio communication apparatus 3. The radio communication apparatus 3 includes a wireless communication antenna 1 for communicating with an existing radio base station (not illustrated) existing at the periphery and a GPS antenna 2 and GPS receiver 4 for receiving radio waves from GPS (Global Positioning System) satellites. The throughput indicates a data amount per unit time at which the radio communication apparatus 3 is capable of communicating with a radio base station.

The throughput estimation means 13 estimates a throughput at a site position when a new radio base station is assumed to be installed thereat by means of simulation using a radio wave propagation model. Parameters of a radio base station to be newly installed are input by a person in charge of site survey using a newly installed base station parameter input unit 5 and are supplied from the newly installed base station parameter input unit 5 to a throughput estimation means 13.

The site position information acquisition unit 19 acquires position information of the radio communication apparatus 3 from the GPS receiver 4 with which the radio communication apparatus 3 is equipped.

The person in charge of site survey confirms the latitude and longitude of the site position from the position information of the radio communication apparatus 3, which has been acquired using the site position information acquisition unit 19, and, in conjunction therewith, obtains a nonattainment degree of target throughput at the site position based on the measured value of throughput, which the throughput measurement means 11 has acquired. In addition, the person in charge of site survey estimates an attainment degree of target throughput at the site position (estimated attainment degree) based on the estimated value of throughput, which has been acquired using the throughput estimation means 13. Furthermore, the person in charge of site survey creates a site position priority order list indicating priority orders of site positions based on the calculated nonattainment degree and estimated attainment degree of target throughput in consideration of the person's own experience.

SUMMARY OF INVENTION

Technical Problem

Regarding the priority order determination method of site positions as described above, a site position priority order list created in consideration of a nonattainment degree of target throughput based on a measured value and an estimated attainment degree based on simulation can be obtained. However, the site position priority order list is created by, as described above, the person in charge of site survey calculating a nonattainment degree and estimated attainment degree of target throughput based on a measured value and estimated value of throughput and further taking into consideration his/her own experience. For this reason, a criterion for determination of a priority order is ambiguous, and there is a problem in that it takes a long time to create a site position priority order list. As a consequence, transition to the site acquisition takes place belatedly, which requires a long time to construct a radio communication network.

Meanwhile, in recent years, a small cell in which an area covered by a radio base station is substantially smaller than that of a macro cell has appeared, and such a situation that a lot of, for example, in the order of several thousands, site positions at which new radio base stations are installed exist in one city has become commonplace. In this case, since, in the site survey, it is required to determine priority orders of site positions out of a great number of candidate locations, creation of a site position priority order list including manual work as described above has become difficult. In addition, there is another problem in that, in the priority order determination method of site positions in the above-described conventional art, dealing with a large number of site positions causes the time required to create a site position priority order list to become longer.

Furthermore, since an area covered by a small cell is very small, a statistical method is incapable of providing a radio wave propagation model having high accuracy. Therefore, estimation accuracy of throughput by means of simulation is decreased and thus an estimation result obtained in such a manner, while serving only as a guide, cannot be said to have high reliability as information used for determining priority orders of site positions.

In addition, since small cells have a large variation in whether or not actually capable of containing users because the covered area of the small cells are very small, effectiveness in driving business by installing a radio base station needs to be taken into consideration. In other words, for determination of priority orders of site positions, it is preferable to establish an evaluation method in consideration of not only evaluation in terms of throughput but also effectiveness in driving business.

In addition, while, when small cells are arranged, the number of site positions increases, effective site positions enabling users to be securely contained in covered areas thereof are limited. In recent years, co-siting in which a plurality of radio communication operators share one site and RAN (Radio Access Network) sharing in which a plurality of radio communication operators share a radio frequency band have been achieved. Thus, it is preferable to determine priority orders of site positions that are also effective for co-siting and RAN sharing. In the above, the radio communication operator means a telecommunications carrier and the like that provide a radio communication service.

The present invention is made to solve problems in the conventional art as described above, and an object of the present invention is to provide a site position priority order determination device and a method therefor that is capable of creating a site position priority order list having high reliability in a shorter time.

Solution to Problem

A site position priority order determination device, according to the present invention, for achieving the above mentioned object, comprises:

a radio communication apparatus that is capable of measuring a reception level and reception quality of a radio signal in communication with a radio base station existing at a periphery;

a site position priority calculation unit for actually measuring service quality at a site position at which a new radio base station is to be installed by transmitting and receiving data to and from the radio base station existing at a periphery using the radio communication apparatus, calculating a nonattainment degree of target service quality based on the measured value of the service quality and, in conjunction therewith, calculating an estimated attainment degree of the target service quality as a result of installing a new radio base station, further calculating a tightness degree of cell load at the site position and a cell capacity supply degree to demand traffic and a competing company degree of dominance regarding the service quality at the site position, and calculating and outputting a weighted sum of the nonattainment degree of target service quality, the estimated attainment degree of target service quality, the tightness degree of cell load, the cell capacity supply degree to demand traffic, and the competing company degree of dominance regarding the service quality at the site position using a parameter set supplied from an outside as a site position priority;

a site position priority storage unit for storing the site position priority with respect to each of the site positions, which is output from the site position priority calculation unit; and a site position priority order determination unit for reading out the site position priority with respect to each of the site positions, which is stored in the site position priority storage unit, determining priority orders of the site positions based on the site position priorities, and outputting a site position priority order list indicating the determined priority orders of the site positions.

On the other hand, a site position priority order determination method, according to the present invention, is a method in which a radio communication apparatus that is capable of measuring a reception level and reception quality of a radio signal in communication with a radio base station existing at a periphery is included, and a computer executes steps of:

by use of the radio communication apparatus, actually measuring service quality at a site position at which a new radio base station is to be installed by transmitting and receiving data to and from the radio base station existing at a periphery;

calculating a nonattainment degree of target service quality based on the measured value of the service quality and, in conjunction therewith, calculating an estimated attainment degree of the target service quality as a result of installing a new radio base station;

further calculating a tightness degree of cell load at the site position and a cell capacity supply degree to demand traffic and a competing company degree of dominance regarding the service quality at the site position, and calculating and outputting a weighted sum of the nonattainment degree of target service quality, the estimated attainment degree of target service quality, the tightness degree of cell load, the cell capacity supply degree to demand traffic, and the competing company degree of dominance regarding the service quality at the site position using a parameter set supplied from an outside as a site position priority;

storing the site position priority with respect to each of the site positions in a storage device; and reading out the site position priority with respect to each of the site positions, which is stored in the storage device, determining the priority orders of site positions at which the new radio base station is to be installed based on the site position priorities, and outputting a site position priority order list indicating the determined the priority orders of site positions.

Advantageous Effects of Invention

The present invention enables a site position priority order list having high reliability to be created in a shorter time.

DESCRIPTION OF EMBODIMENTS

Next, the present invention will be described using the drawings.

In the present invention, a device for determining priority orders of site positions (site position priority order determination device) out of a great number of existing site position candidates in consideration of the following indicators, which were not taken into consideration in a site survey of the conventional art described above, is provided:

indicator 1: a tightness degree of cell load;

indicator 2: a cell capacity supply degree to demand traffic; and indicator 3: a competing company degree of dominance regarding throughput.

(First Example Embodiment)

Figure 1:
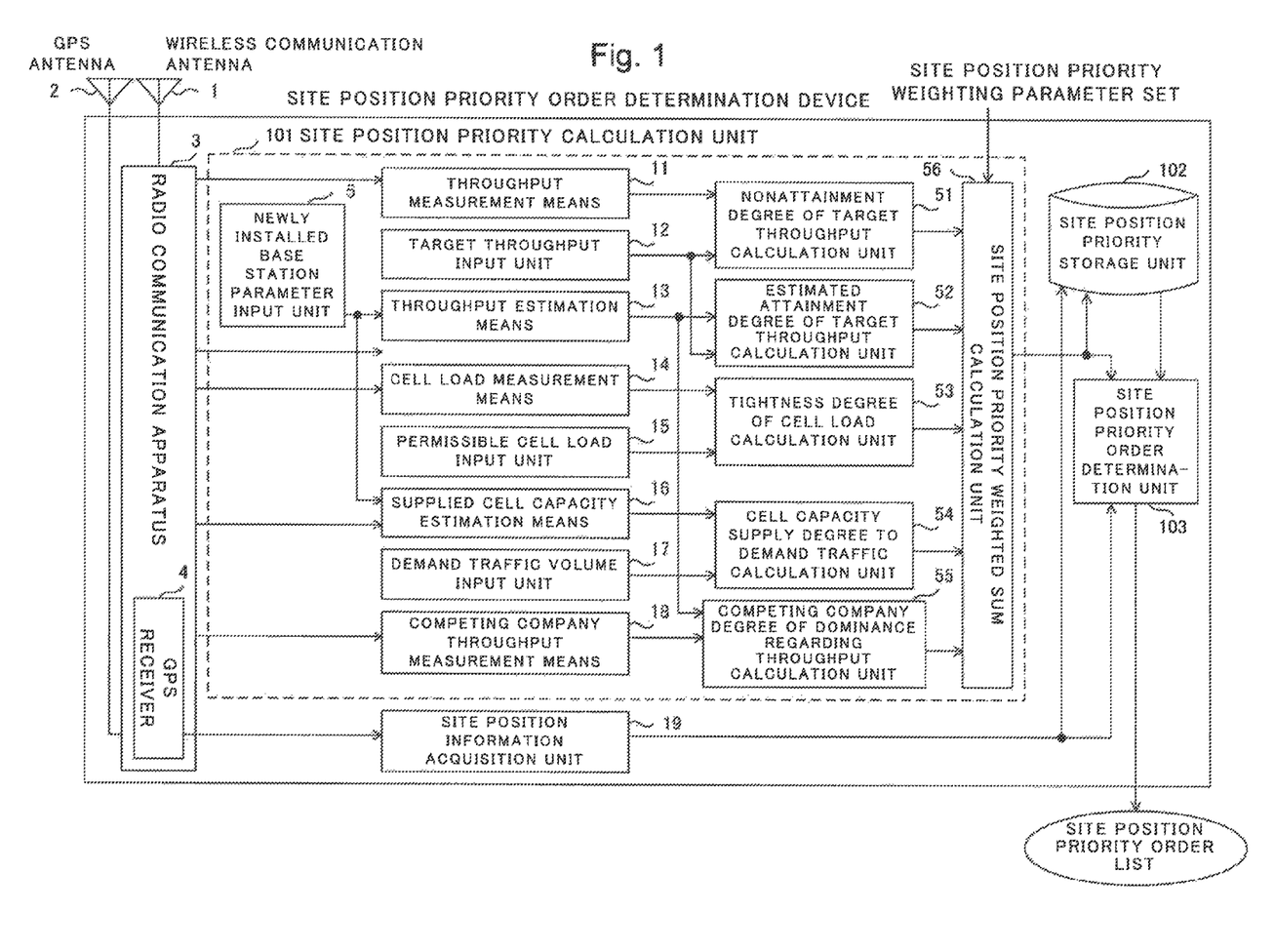
FIG. 1 is a block diagram illustrating a configuration example of a site position priority order determination device of a first example embodiment.

FIG. 1 is a block diagram illustrating a configuration example of a site position priority order determination device of a first example embodiment. In FIG. 1, the same reference signs are assigned to the same constituent elements as those used in the site position priority order determination method of the conventional art illustrated in FIG. 6.

As illustrated in FIG. 1, the site position priority order determination device of the first example embodiment includes a wireless communication antenna 1, a GPS antenna 2, a radio communication apparatus 3, a GPS receiver 4, a site position information acquisition unit 19, a site position priority calculation unit 101, a site position priority storage unit 102, and a site position priority order determination unit 103.

The site position priority calculation unit 101 calculates respective indicators for each site position that are required for determining a priority order of the site position and calculates and outputs a weighted sum of the respective calculated indicators. The indicators for each site position include a nonattainment degree of target throughput by a measured throughput, an estimated attainment degree of target throughput as a result of installing a new radio base station, a tightness degree of cell load, a cell capacity supply degree to demand traffic, a competing company degree of dominance regarding throughput, and the like.

The site position priority storage unit 102 stores values after calculation of the weighted sums (site position priorities) at respective site positions, which are output from the site position priority calculation unit 101.

The site position priority order determination unit 103 determines priority orders of site positions at which a radio base station is to be newly installed based on the values after calculation of the weighted sums (site position priorities) at the respective site positions, which are stored by the site position priority storage unit 102, and outputs a site position priority order list indicating the determined priority orders of site positions. The number of site positions listed in the site position priority order list is assumed to be changeable by an instruction from a person in charge of site survey and the like.

The radio communication apparatus 3 has a configuration that enables communication with an existing radio base station (not illustrated) via the wireless communication antenna 1 inside a cell that the radio base station manages. In addition, the radio communication apparatus 3 includes the GPS antenna 2 and the GPS receiver 4 for receiving radio waves from GPS satellites and acquires position information (latitude and longitude) of the radio communication apparatus 3 using the GPS receiver 4. Further, the radio communication apparatus 3 is capable of measuring a reception level, reception quality, and the like of a radio signal in communication with an existing radio base station and has a configuration that enables such measured values to be output in response to a request from the outside. For example, when the radio communication system is an LTE (Long Term Evolution) system, RSSI (Received Signal Strength Indication) and RSRP (Reference Signal Received Power) can be measured as a reception level. In addition, as reception quality, RS SINR (Reference Signal Signal-to-Interference Noise Ratio) or RSRQ (Reference Signal Received Quality) can be measured. Furthermore, the radio communication apparatus 3 is capable of mounting thereon SIM (Subscriber Identity Module) cards of a plurality of radio communication operators and has a configuration that enables communication with radio base stations that the plurality of radio communication operators have installed. For example, the radio communication apparatus 3 is capable of communicating with not only a radio communication operator regarding which a site survey is performed (hereinafter, referred to as a primary radio communication operator) but also a radio base station of another radio communication operator. The radio communication apparatus 3 only needs to have a configuration that enables communication with a plurality of radio communication operators, and such a configuration may be achieved by a single radio communication apparatus or a plurality of radio communication apparatuses on which SIM cards of different radio communication operators are individually mounted.

The radio communication apparatus 3 may be achieved by, for example, a mobile phone (including a smartphone, a tablet type computer, and the like) equipped with the wireless communication antenna 1, the GPS antenna 2, and the GPS receiver 4.

The site position priority calculation unit 101, the site position priority storage unit 102, and the site position priority order determination unit 103 may be achieved by an information processing device (computer) that includes a CPU (Central Processing Unit), a semiconductor memory, a storage device, an input device (a keyboard, a mouse, and the like), an output device (a display), and the like and performs processing in accordance with a program.

As illustrated in FIG. 1, the site position priority calculation unit 101 includes a newly installed base station parameter input unit 5, a throughput measurement means 11, a target throughput input unit 12, a throughput estimation means 13, a cell load measurement means 14, a permissible cell load input unit 15, a supplied cell capacity estimation means 16, a demand traffic volume input unit 17, a competing company throughput measurement means 18, a nonattainment degree of target throughput calculation unit 51, an estimated attainment degree of target throughput calculation unit 52, a tightness degree of cell load calculation unit 53, a cell capacity supply degree to demand traffic calculation unit 54, a competing company degree of dominance regarding throughput calculation unit 55, and a site position priority weighted sum calculation unit 56.

The newly installed base station parameter input unit 5 is an interface that a person in charge of site survey and the like (hereinafter, referred to as a user) who uses the site position priority order determination device of the present invention uses for inputting parameters of a new radio base station. The parameters include a site identifier (ID) for identifying a site position, transmission frequency, transmission power, frequency bandwidth, antenna height, antenna gain, and the like. An example of a screen for inputting such parameters is illustrated FIG. 3.

Figure 3:
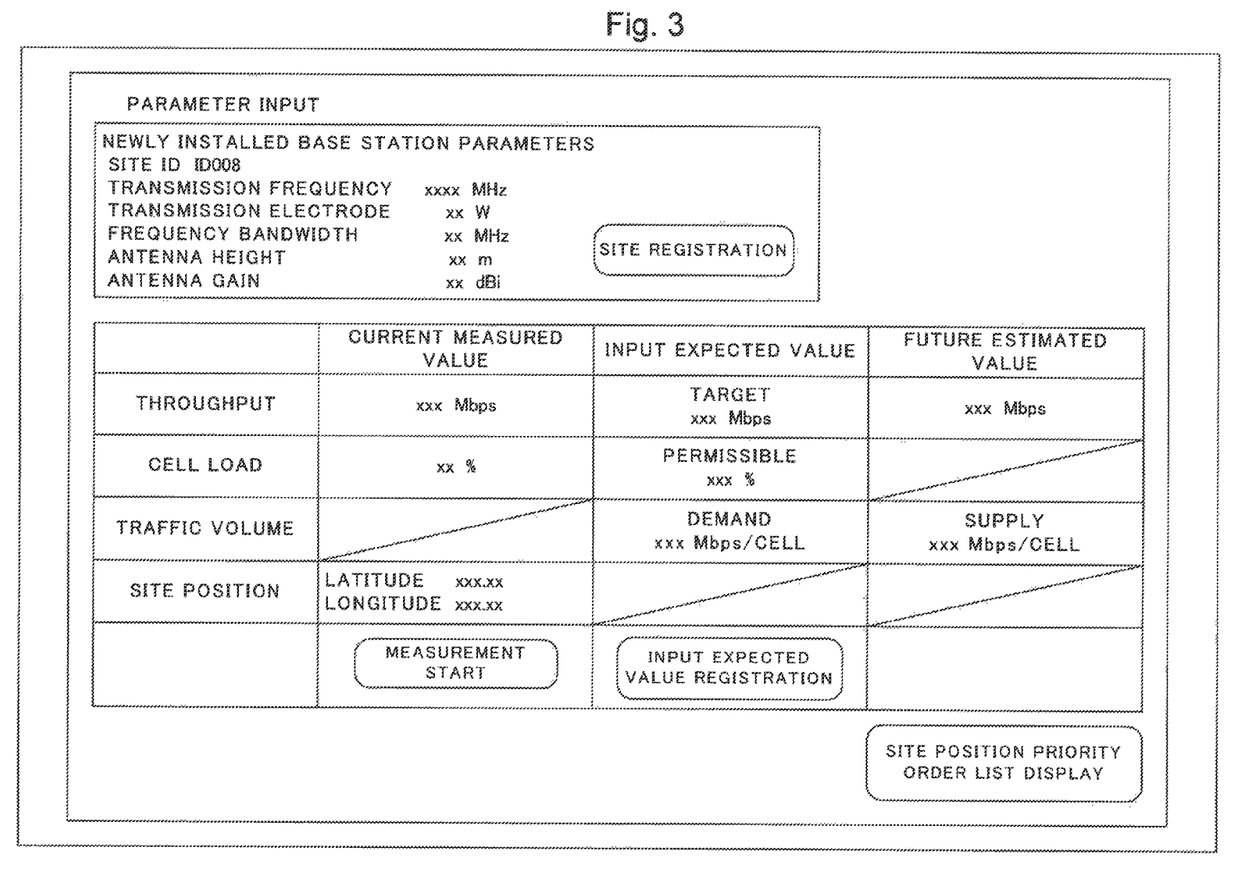
FIG. 3 is a schematic view illustrating an example of an input screen of parameters of a new radio base station.

FIG. 3 illustrates a screen example in which a list of parameters of a newly installed base station is displayed and, in conjunction therewith, a "site registration" button for transition to an input screen for inputting the parameters is displayed. It should be noted that an example is illustrated in which parameters that have been input are displayed and, in conjunction therewith, an input result and a processing result to and from the site position priority order determination device and buttons that the user uses for inputting instructions are displayed in the screen example illustrated in FIG. 3. Details of the displayed screen will be described later. The newly installed base station parameter input unit 5 outputs input parameters to each of the throughput estimation means 13 and the supplied cell capacity estimation means 16.

The throughput measurement means 11 measures a throughput provided by the primary radio communication operator at a current site position using the radio communication apparatus 3.

In the present example embodiment, although description will be made using an example in which throughput is set as an indicator of service quality in a communication network provided at respective site positions, the indicator of service quality is not limited to throughput, and other indicators, such as delay time and connectivity, may be used. The target throughput input unit 12 is an interface that the user uses for inputting a target throughput (target service quality) at the site position.

The target throughput input unit 12 outputs the input target throughput to each of the nonattainment degree of target throughput calculation unit 51 and the estimated attainment degree of target throughput calculation unit 52.

Using the parameters supplied from the newly installed base station parameter input unit 5, the throughput estimation means 13 estimates a throughput at the site position supposed to be attained as a result of installing a new radio base station.

The cell load measurement means 14 calculates a cell load in a peripheral cell based on a reception level and reception quality in the peripheral cell measured by the radio communication apparatus 3.

The permissible cell load input unit 15 is an interface that the user uses for inputting a value for a cell load permissible in a cell managed by an existing radio base station. The permissible cell load input unit 15 outputs the input value of the permissible cell load to the tightness degree of cell load calculation unit 53.

The supplied cell capacity estimation means 16 estimates a supplied cell capacity at the site position based on the parameters of the new radio base station and a reception level of a radio signal from the peripheral cell, which is measured by the radio communication apparatus 3.

The demand traffic volume input unit 17 is an interface that the user uses for inputting a demand traffic volume expected at the site position. The demand traffic volume input unit 17 outputs the input expected demand traffic volume to the cell capacity supply degree to demand traffic calculation unit 54.

The competing company throughput measurement means 18 measures throughputs provided by radio communication operators other than the primary radio communication operator in order using the radio communication apparatus 3.

The site position information acquisition unit 19 acquires position information (latitude and longitude) of the radio communication apparatus 3 using the GPS receiver 4 and outputs the position information to the site position priority storage unit 102 and the site position priority order determination unit 103.

The nonattainment degree of target throughput calculation unit 51 calculates a nonattainment degree of target throughput based on a throughput measured by the throughput measurement means 11 (measured value) and a target throughput accepted from the target throughput input unit 12.

The estimated attainment degree of target throughput calculation unit 52 calculates an estimated attainment degree of target throughput based on a throughput at the site position estimated by the throughput estimation means 13 and a target throughput accepted from the target throughput input unit 12.

The tightness degree of cell load calculation unit 53 calculates a tightness degree of cell load based on a cell load in a peripheral cell calculated by the cell load measurement means 14 and a permissible cell load accepted from the permissible cell load input unit 15. The tightness degree of cell load is an indicator that indicates a necessity degree of a new radio base station and is calculated from an actual cell load and a permissible cell load.

The cell capacity supply degree to demand traffic calculation unit 54 calculates a cell capacity supply degree to demand traffic based on a supplied cell capacity estimated by the supplied cell capacity estimation means 16 and an expected demand traffic volume. The cell capacity supply degree indicates a traffic volume that can be supplied in a peripheral cell (cell capacity) against an expected demand traffic volume.

The competing company degree of dominance regarding throughput calculation unit 55 calculates an expected competing company degree of dominance by a primary radio communication operator based on a throughput provided by the primary radio communication operator estimated by the throughput estimation means 13 and throughputs provided by other radio communication operators measured by the competing company throughput measurement means 18.

The site position priority weighted sum calculation unit 56 accepts respective values calculated by the nonattainment degree of target throughput calculation unit 51, the estimated attainment degree of target throughput calculation unit 52, the tightness degree of cell load calculation unit 53, the cell capacity supply degree to demand traffic calculation unit 54, and the competing company degree of dominance regarding throughput calculation unit 55. In addition, the site position priority weighted sum calculation unit 56 weights the accepted values based on a site position priority weighting parameter set supplied from the outside and, subsequently, calculates and outputs a sum of the weighted values.

Next, an operation of the site position priority order determination device having such a configuration, illustrated in FIG. 1, will be described.

When a user starts an operation of the site position priority order determination device, illustrated in FIG. 1, at a site position to which a new radio base station is to be installed, the throughput measurement means 11 starts measurement of throughput in response to a measurement start instruction the user has input.

A screen through which the user inputs the measurement start instruction is exemplified in, for example, FIG. 3.

In FIG. 3, a screen example is illustrated in which a "measurement start" button for the user instructing measurement start, an "input expected value registration" button for transition to an input screen for the user inputting a target throughput, a permissible cell load, and a demand traffic volume, and a "site position priority order list display" button for displaying a site position priority order list are displayed. Furthermore, in FIG. 3, a screen example is illustrated in which a measured value of throughput measured by the throughput measurement means 11 (current measured value), a cell load in a peripheral cell measured by the cell load measurement means 14, position information (latitude and longitude) of the radio communication apparatus 3 acquired by the site position information acquisition unit 19, a target throughput, permissible cell load, and demand traffic volume that the user has input, a throughput estimated by the throughput estimation means 13, and a supplied cell capacity estimated by the supplied cell capacity estimation means 16 are displayed.

The throughput measurement means 11 measures a throughput by performing transmission and reception of data (download or upload of data, or both thereof) to and from an existing radio base station that a primary radio communication operator owns using the radio communication apparatus 3. A measured value of throughput (measured throughput) measured by the throughput measurement means 11 is output to the nonattainment degree of target throughput calculation unit 51. The nonattainment degree of target throughput calculation unit 51 calculates a nonattainment degree of target throughput at a site position based on the measured throughput, measured by the throughput measurement means 11, and a target throughput accepted from the target throughput input unit 12. The nonattainment degree of target throughput is calculated using, for example, the equation (1) below:

$$\text{Nonattainment degree of target throughput}=(\text{Target throughput}-\text{Measured throughput})/\text{Target throughput} \quad (1).$$

The nonattainment degree of target throughput calculation unit 51 outputs the calculated nonattainment degree of target throughput to the site position priority weighted sum calculation unit 56.

When accepting parameters of the new radio base station from the newly installed base station parameter input unit 5, the throughput estimation means 13 estimates a throughput at the current site position using the parameters. The throughput estimation means 13 outputs the estimated throughput (estimated throughput) to each of the estimated attainment degree of target throughput calculation unit 52 and the competing company degree of dominance regarding throughput calculation unit 55.

In the throughput estimation processing, a throughput may be estimated by performing simulation using a well-known radio wave propagation model. In the above processing, when a small cell is newly installed, the estimation processing using simulation is confined to processing using a simple method, and estimation processing of throughput is performed in which weight is given to influence from a reception level of a radio signal from a peripheral cell. For example, when the radio communication system is an LTE system, a throughput may be estimated using RSRP, which indicates a reception level of a radio signal arriving at the site position from a peripheral cell. In a small cell, the magnitude of a reception level of a radio signal from a peripheral cell existing at the periphery, that is, an interference level from a peripheral cell, dominates throughput at a radio base station to be newly installed most strongly. For this reason, when a small cell is newly arranged, a throughput therein may be estimated based on influence from a reception level of a radio signal from a peripheral cell.

When accepting the estimated throughput from the throughput estimation means 13, the estimated attainment degree of target throughput calculation unit 52 calculates an estimated attainment degree of target throughput based on the target throughput accepted from the target throughput input unit 12. The estimated attainment degree of target throughput is calculated using, for example, the equation (2) below:

$$\text{Estimated attainment degree of target throughput}=\text{Estimated throughput}/\text{Target throughput} \quad (2).$$

The estimated attainment degree of target throughput calculation unit 52 outputs the calculated estimated attainment degree of target throughput to the site position priority weighted sum calculation unit 56.

When the measurement start instruction is input by the user, the cell load measurement means 14 measures a reception level and reception quality of a radio signal from a peripheral cell using the radio communication apparatus 3 and, based on the measured values, calculates a cell load in the peripheral cell. When using an LTE system, a cell load may be calculated based on actually measured values of RSRP and RSRQ using the equation (4) that is described in, for example, WO 2014/087671 pamphlet. The cell load measurement means 14 outputs the calculated cell load in the peripheral cell to the tightness degree of cell load calculation unit 53.

When accepting the cell load in the peripheral cell from the cell load measurement means 14, the tightness degree of cell load calculation unit 53 calculates a tightness degree of cell load using the permissible cell load accepted from the permissible cell load input unit 15.

The tightness degree of cell load is calculated using, for example, the equation (3) below:

$$\text{Tightness degree of cell load}=\text{Cell load}/\text{Permissible cell load} \quad (3).$$

The tightness degree of cell load calculation unit 53 outputs the calculated tightness degree of cell load to the site position priority weighted sum calculation unit 56.

When the measurement start instruction is input by the user, the supplied cell capacity estimation means 16 measures a reception level of a radio signal from the peripheral cell using the radio communication apparatus 3. In addition, the supplied cell capacity estimation means 16 estimates a supplied cell capacity at the site position using the measured value and the parameters accepted from the newly installed base station parameter input unit 5. The estimated supplied cell capacity is output to the cell capacity supply degree to demand traffic calculation unit 54.

When a small cell is newly installed, as with the throughput estimation means 13, the supplied cell capacity estimation means 16 may confine estimation processing using simulation and the like to a simple method and perform estimation processing of a supplied cell capacity in which weight is given to influence from a reception level of a radio signal from the peripheral cell. In a small cell, the magnitudes of a reception level of a radio signal from a peripheral cell existing at the periphery, that is, an interference level from a peripheral cell, dominates supplied cell capacity at a radio base station to be newly installed most strongly. For this reason, when a small cell is newly arranged, a supplied cell capacity is estimated based on influence from a reception level of a radio signal from a peripheral cell.

When accepting the supplied cell capacity from the supplied cell capacity estimation means 16, the cell capacity supply degree to demand traffic calculation unit 54 calculates a cell capacity supply degree to demand traffic using the demand traffic volume expected at the site position, which is accepted from the demand traffic volume input unit 17.

The cell capacity supply degree to demand traffic is calculated using, for example, the equation (5) below:

$$\text{Cell capacity supply degree}=\text{Supplied cell capacity}/\text{Demand traffic volume} \quad (5).$$

The cell capacity supply degree to demand traffic calculation unit 54 outputs the calculated cell capacity supply degree to demand traffic to the site position priority weighted sum calculation unit 56.

When the measurement start instruction is input by the user, the competing company throughput measurement means 18 measures, in order, throughputs in communication with radio base stations that radio communication operators other than the primary radio communication operator have installed using the radio communication apparatus 3. The competing company throughput measurement means 18 outputs the measured throughputs provided by other radio communication operators to the competing company degree of dominance regarding throughput calculation unit 55.

When accepting the throughputs provided by the other radio communication operators from the competing company throughput measurement means 18, the competing company degree of dominance regarding throughput calculation unit 55 calculates a competing company degree of dominance by the primary radio communication operator based on the estimated throughput received from the throughput estimation means 13.

The competing company degree of dominance by the primary radio communication operator is calculated using, for example, the equation (6) below:

$$\text{Competing company degree of dominance} = \text{Estimated throughput} / \text{Average value of competing company throughputs} \qquad (6).$$

The competing company degree of dominance regarding throughput calculation unit 55 outputs the calculated competing company degree of dominance by the primary radio communication operator to the site position priority weighted sum calculation unit 56.

When accepting the nonattainment degree and estimated attainment degree of target throughput, the tightness degree of cell load, the cell capacity supply degree to demand traffic, and the competing company degree of dominance by the primary radio operator, the site position priority weighted sum calculation unit 56 calculates and outputs a weighted sum of the respective input values using a site position priority weighting parameter set input from the outside.

As described, performing appropriate calculation of a weighted sum of the nonattainment degree and estimated attainment degree of target throughput, the tightness degree of cell load, the cell capacity supply degree to demand traffic, and the competing company degree of dominance by the primary radio operator in the above-described manner enables conversion thereof into a single evaluation value (site position priority) reflecting actual business.

The site position priority weighted sum calculation unit 56 outputs the calculated site position priority to the site position priority storage unit 102.

The site position priority storage unit 102 stores the site position priority accepted from the site position priority weighted sum calculation unit 56 and, in conjunction therewith, outputs site position priorities that are stored to the site position priority order determination unit 103.

The site position priority order determination unit 103 determines priority orders of respective site positions based on site position priorities for the respective site positions, which are stored in the site position priority storage unit 102, and outputs a site position priority order list.

Figure 4:
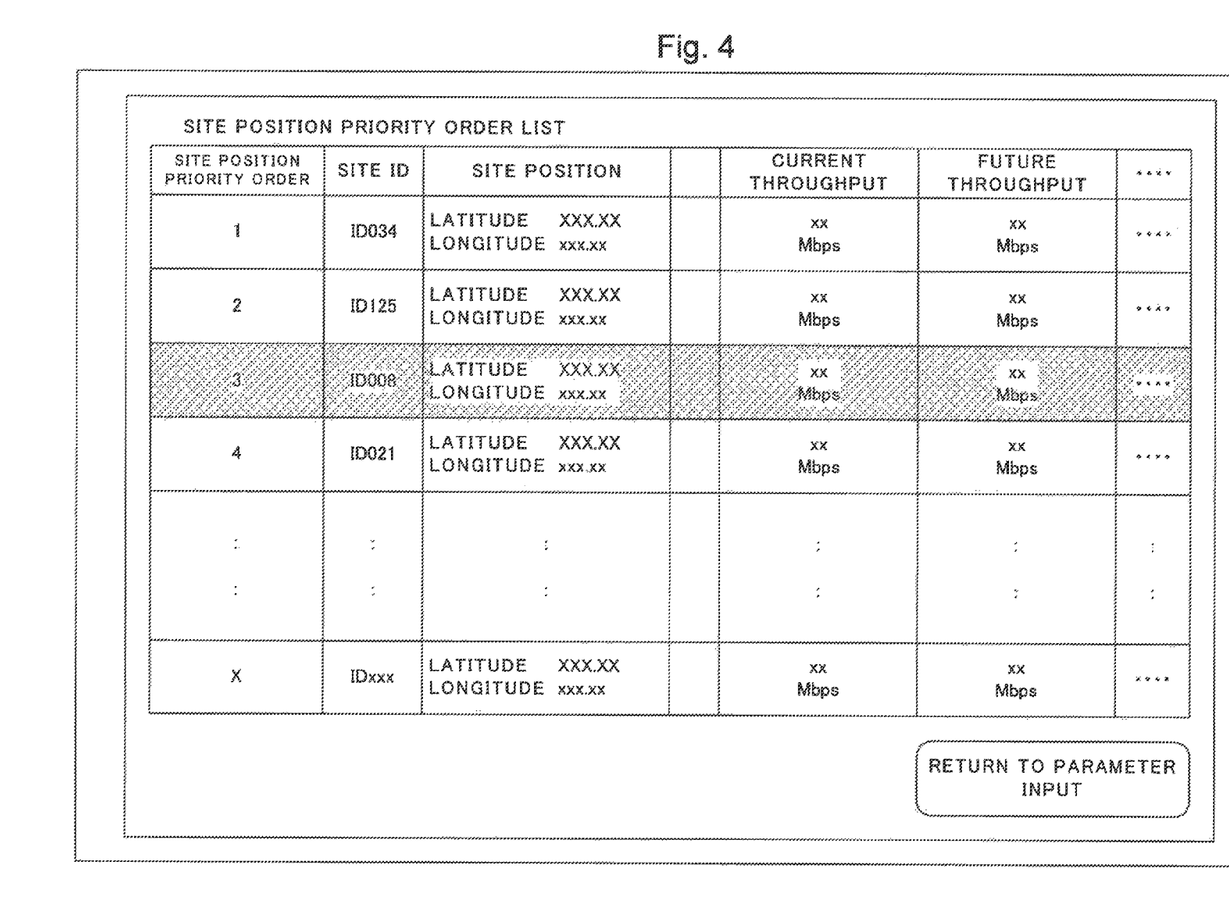
FIG. 4 is a schematic view illustrating an example of an output screen of a site position priority order list.

An example of an output screen of the site position priority order list is illustrated in FIG. 4.

As illustrated in FIG. 4, in the site position priority order list, at least priority orders and site IDs for respective site positions are specified. In the site position priority order list, values used for evaluation at the site positions, such as latitude and longitude information of the site positions, measured throughputs at the site positions (current throughput), throughputs estimated for a case where a radio base station is installed at the site positions (future throughput), and the like, may be included.

According to the first example embodiment, since priority orders of site positions at which a new radio base station is to be installed can be determined by computer processing based on a definite determination method, a site position priority order list may be created in a shorter time than the conventional art as illustrated in FIG. 6. In particular, the advantageous effect of the first example embodiment is substantial when a small cell regarding which priority orders of site positions thereof need to be determined out of a great number of candidate locations is arranged, and a site survey may be performed in a shorter time than the conventional art as illustrated in FIG. 6.

In addition, estimating a throughput with weight given to influence from a reception level of a radio signal from a peripheral cell enables the accuracy of an estimated value of throughput, which served only as a guide in the conventional art as illustrated in FIG. 6, to be improved. For this reason, a site position priority order list having higher reliability than in the conventional art as illustrated in FIG. 6 may be obtained.

Furthermore, since a site position priority order list is created including indicators related to effectiveness in driving business, such as a tightness degree of cell load, a cell capacity supply degree to demand traffic, and a competing company degree of dominance regarding throughput, priority orders of site positions with weight given to effectiveness in driving business may be obtained.

(Second Example Embodiment)

Next, a second example embodiment of the present invention will be described using the drawings.

Figure 2:
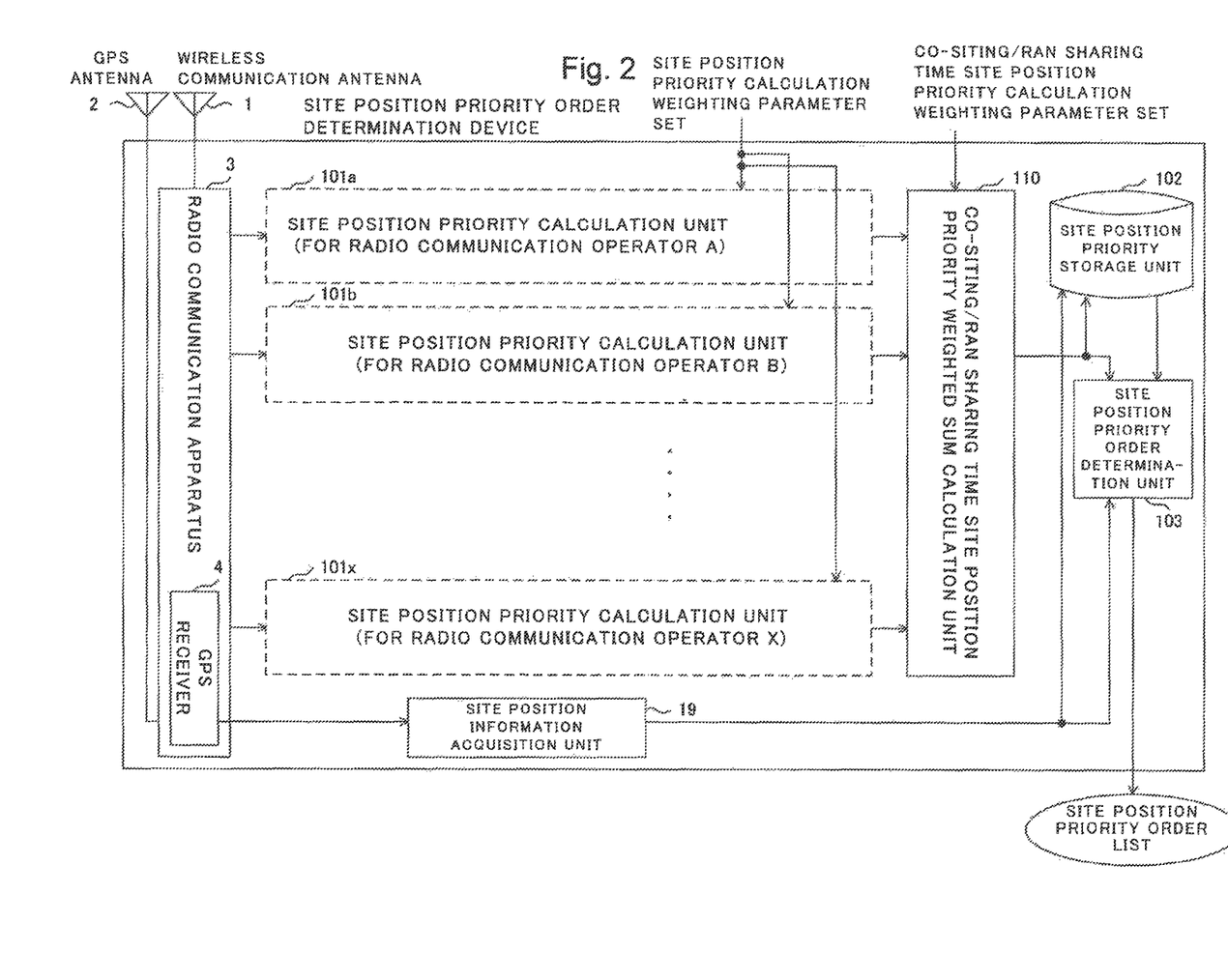
FIG. 2 is a block diagram illustrating a configuration example of a site position priority order determination device of a second example embodiment.

FIG. 2 is a block diagram illustrating a configuration example of a site position priority order determination device of the second example embodiment. In FIG. 2, the same reference signs are assigned to the same constituent elements as those used in the site position priority order determination method of the conventional art illustrated in FIG. 6.

As illustrated in FIG. 2, the site position priority order determination device of the second example embodiment has a configuration including a plurality of site position priority calculation units illustrated in FIG. 1 and further including a co-siting/RAN sharing time site position priority weighted sum calculation unit 110.

Each of site position priority calculation units 101a to 101x is configured to calculate a site position priority for one of different radio communication operators, that is, to cope with a different primary radio communication operator. To each of the site position priority calculation units 101a to 101x, using a newly installed base station parameter input unit 5 with which the site position priority calculation unit is equipped, parameters of a radio base station reflecting co-siting or RAN sharing among primary radio communication operators are input.

Each of the site position priority calculation units 101a to 101x calculates a site position priority for a primary radio communication operator corresponding to the site position priority calculation unit and outputs the calculated site position priority to a co-siting/RAN sharing time site position priority weighted sum calculation unit 110.

The co-siting/RAN sharing time site position priority weighted sum calculation unit 110 calculates and outputs a weighted sum of site position priorities for respective radio communication operators, which the site position priority calculation units 101a to 101x have calculated, using a co-siting/RAN sharing time site position priority calculation weighting parameter set that is input from the outside.

The co-siting/RAN sharing time site position priority weighted sum calculation unit 110 outputs the calculated weighted sum of site position priorities to a site position priority storage unit 102 and a site position priority order determination unit 103. Since the other configuration details and operation are the same as those of the site position priority order determination device of the first example embodiment, a description thereof will be omitted.

According to the site position priority order determination device of the second example embodiment, sharing methods of a site position among radio communication operators are assumed for a plurality of cases, and a site position priority in each case is calculated.

For this reason, in addition to the same advantageous effects as those of the site position priority order determination device of the first example embodiment, a sharing method among radio communication operators that has a highest site position priority, that is, a sharing method that increases the importance of a site position most, may be selected.

(Third Example Embodiment)

Next, a third example embodiment of the present invention will be described using the drawings.

Figure 5:
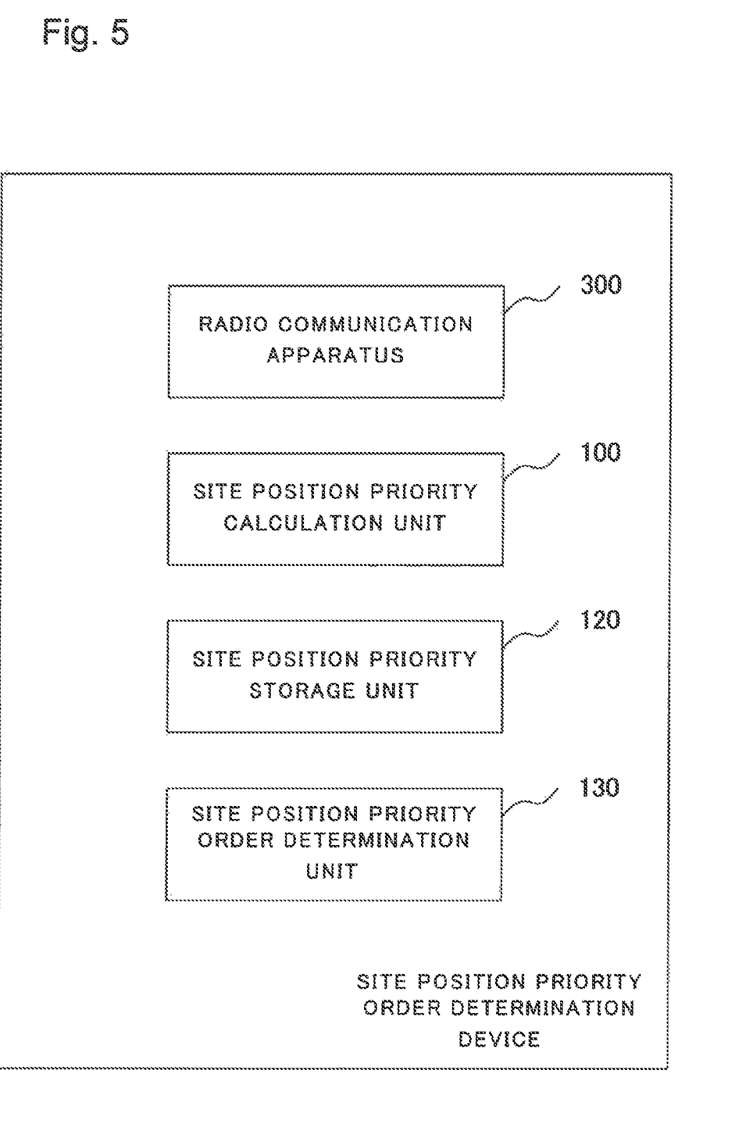
FIG. 5 is a block diagram illustrating a configuration example of a site position priority order determination device of a third example embodiment.

FIG. 5 is a block diagram illustrating a configuration example of a site position priority order determination device of the third example embodiment. As illustrated in FIG. 5, the site position priority order determination device of the third example embodiment includes a radio communication apparatus 300, a site position priority calculation unit 100, a site position priority storage unit 120, and a site position priority order determination unit 130.

The radio communication apparatus 300 is capable of measuring a reception level and reception quality of a radio signal in communication with a radio base station existing at a periphery.

The site position priority calculation unit 100 actually measures service quality at a site position at which a new radio base station is to be installed by transmitting and receiving data to and from a radio base station existing at a periphery using the radio communication apparatus 300, calculates a nonattainment degree of target service quality based on the measured value of service quality and, in conjunction therewith, calculates an estimated attainment degree of target service quality as a result of installing the new radio base station, further calculates a tightness degree of cell load at the site position and a cell capacity supply degree to demand traffic and a competing company degree of dominance regarding service quality at the site position, and calculates and outputs a weighted sum of the nonattainment degree of target service quality, the estimated attainment degree of target service quality, the tightness degree of cell load, the cell capacity supply degree to demand traffic, and the competing company degree of dominance regarding service quality at the site position using a parameter set supplied from the outside as a site position priority.

The site position priority storage unit 120 stores a site position priority with respect to each site position, which is output from the site position priority calculation unit 100.

The site position priority order determination unit 130 reads out a site position priority with respect to each site position, which is stored in the site position priority storage unit 120, determines priority orders of the site positions based on the site position priorities, and outputs a site position priority order list indicating the determined priority orders of the site positions.

According to the present example embodiment, the site position priority calculation unit 100 outputs priorities of site positions at which a radio base station is to be installed, which are determined based on a definite determination method, and the site position priority order determination unit 130 determines priority orders based on the priorities. Therefore, a site position priority order list having high reliability may be created in a shorter time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-057901, filed on Mar. 20, 2015, the disclosure of which is incorporated herein in its entirety by reference.

REFERENCE SIGNS LIST

1 Wireless communication antenna
2 GPS antenna
3, 300 Radio communication apparatus
4 GPS receiver
5 Newly installed base station parameter input unit
11 Throughput measurement means
12 Target throughput input unit
13 Throughput estimation means
14 Cell load measurement means
15 Permissible cell load input unit
16 Supplied cell capacity estimation means
17 Demand traffic volume input unit
18 Competing company throughput measurement means
19 Site position information acquisition unit
51 Nonattainment degree of target throughput calculation unit
52 Estimated attainment degree of target throughput calculation unit
53 Tightness degree of cell load calculation unit
54 Cell capacity supply degree to demand traffic calculation unit
55 Competing company degree of dominance regarding throughput calculation unit
56 Site position priority weighted sum calculation unit
100, 101, 101*a* to 101*x* Site position priority calculation unit
102, 120 Site position priority storage unit
103, 130 Site position priority order determination unit
110 Co-siting/RAN sharing time site position priority weighted sum calculation unit

The invention claimed is:

1. A site position priority order determination device, comprising:
   a radio communication apparatus that is capable of measuring a reception level and reception quality of a radio signal in communication with a radio base station existing at a periphery;
   a site position priority calculation unit for actually measuring service quality at a site position at which a new radio base station is to be installed by:
   transmitting and receiving data to and from the radio base station existing at the periphery using the radio communication apparatus, and calculating a nonattainment degree of target service quality based on the measured value of the service quality and, in conjunction therewith;

calculating an estimated attainment degree of the target service quality as a result of installing the new radio base station, further calculating a tightness degree of cell load at the site position and a cell capacity supply degree to demand traffic and a competing company degree of dominance regarding the service quality at the site position, and using a parameter set supplied from an outside party or person as a site position priority, determining weighted values of the nonattainment degree of target service quality, the estimated attainment degree of target service quality, the tightness degree of cell load, the cell capacity supply degree to demand traffic, and the competing company degree of dominance regarding the service quality at the site position, and calculating and outputting a weighted sum of the weighted values;

a site position priority storage unit for storing the site position priority with respect to each of the site positions, which is output from the site position priority calculation unit; and a site position priority order determination unit for reading out the site position priority with respect to each of the site positions, which is stored in the site position priority storage unit, determining priority orders of the site positions based on the site position priorities, and outputting a site position priority order list indicating the determined priority orders of the site positions.

2. The site position priority order determination device according to claim 1, further comprising:

a plurality of site position priority calculation units; and a co-siting/RAN sharing time site position priority weighted sum calculation unit for calculating and outputting a weighted sum of the site position priorities each of which is output from one of the respective site position priority calculation units using a parameter set supplied from an outside, wherein each of the plurality of site position priority calculation units calculates a site position priority for one of different radio communication operators.

3. The site position priority order determination device according to claim 1, wherein the service quality is a throughput that indicates a data amount per unit time that the radio communication apparatus is capable of communicating with the radio base station.

4. The site position priority order determination device according to claim 1, wherein in the new radio base stations, a radio base station that manages a small cell the covered area of which is smaller than a macro cell is included.

5. A site position priority order determination method, comprising:

by use of a radio communication apparatus that is capable of measuring a reception level and reception quality of a radio signal in communication with a radio base station existing at a periphery, actually measuring service quality at a site position at which a new radio base station is to be installed by transmitting and receiving data to and from the radio base station existing at the periphery;

calculating a nonattainment degree of target service quality based on the measured value of the service quality and, in conjunction therewith, calculating an estimated attainment degree of the target service quality as a result of installing the new radio base station;

further calculating a tightness degree of cell load at the site position and a cell capacity supply degree to demand traffic and a competing company degree of dominance regarding the service quality at the site position, and, using a parameter set supplied from an outside party or person as a site position priority, determining weighted values of the nonattainment degree of target service quality, the estimated attainment degree of target service quality, the tightness degree of cell load, the cell capacity supply degree to demand traffic, and the competing company degree of dominance regarding the service quality at the site position, and calculating and outputting a weighted sum of the weighted values;

storing the site position priority with respect to each of the site positions in a storage device; and reading out the site position priority with respect to each of the site positions, which is stored in the storage device, determining the priority orders of site positions at which the new radio base station is to be installed based on the site position priorities, and outputting a site position priority order list indicating the determined priority orders of site positions.

6. The site position priority order determination method according to claim 5, further comprising:

calculating the site position priority for each of different radio communication operators; and calculating and outputting a weighted sum of a plurality of the site position priorities using a parameter set supplied from an outside.

7. A non-transitory storage medium storing a program for site position priority order determination, the program making a computer execute steps of:

by use of a radio communication apparatus that is capable of measuring a reception level and reception quality of a radio signal in communication with a radio base station existing at a periphery, actually measuring service quality at a site position at which a new radio base station is to be installed by transmitting and receiving data to and from the radio base station existing at the periphery;

calculating a nonattainment degree of target service quality based on the measured value of the service quality and, in conjunction therewith, calculating an estimated attainment degree of the target service quality as a result of installing the new radio base station;

further calculating a tightness degree of cell load at the site position and a cell capacity supply degree to demand traffic and a competing company degree of dominance regarding the service quality at the site position, and, using a parameter set supplied from an outside party or person as a site position priority, determining weighted values of the nonattainment degree of target service quality, the estimated attainment degree of target service quality, the tightness degree of cell load, the cell capacity supply degree to demand traffic, and the competing company degree of dominance regarding the service quality at the site position, and calculating and outputting a weighted sum of the weighted values;

storing the site position priority with respect to each of the site positions in a storage device; and reading out the site position priority with respect to each of the site positions, which is stored in the storage device, determining the priority orders of site positions at which the new radio base station is to be installed based on the site position priorities, and outputting a site position priority order list indicating the determined priority orders of site positions.

* * * * *